United States Patent [19]
Pilhall

[11] Patent Number: 6,095,585
[45] Date of Patent: Aug. 1, 2000

[54] SLIDING CARGO FLOOR

[75] Inventor: Stig Pilhall, Trollhättan, Sweden

[73] Assignee: Volvo Personvagnar AB, Göteborg, Sweden

[21] Appl. No.: 09/308,822
[22] PCT Filed: Nov. 24, 1997
[86] PCT No.: PCT/SE97/01970
§ 371 Date: Aug. 27, 1999
§ 102(e) Date: Aug. 27, 1999
[87] PCT Pub. No.: WO98/23465
PCT Pub. Date: Jun. 4, 1998

[30] Foreign Application Priority Data

Nov. 26, 1996 [SE] Sweden .................................. 9604372

[51] Int. Cl.[7] .................................................. B60P 1/52
[52] U.S. Cl. ...................... 296/26.1; 296/26.11; 414/522
[58] Field of Search ............................. 296/26.09, 26.08, 296/26.1, 26.11; 414/522

[56] References Cited

U.S. PATENT DOCUMENTS 3,132,755  5/1964  Greenslate ............................... 414/522
5,584,524  12/1996  Vogel ..................................... 296/39.1

FOREIGN PATENT DOCUMENTS

WO 82/02175  7/1982  WIPO .............................. B60R 5/04

OTHER PUBLICATIONS

Jpn Abstract, 62–128848A, Nakajima, Jun. 1987.
Jpn Abstract, 61–249850A, Kazama, Nov. 1986.
Jpn Abstract, 61–122048A, Shigesada, Jun. 1986.

*Primary Examiner*—D. Glenn Dayoan
*Assistant Examiner*—Greg Blankenship
*Attorney, Agent, or Firm*—Royston, Rayzor, Vickery, Novak & Druce, L.L.P.

[57] ABSTRACT

A cargo floor for use in vehicles including front and rear floor portions with at least the rear floor portion being slidable out of the vehicle, the rear end of the front floor portion including an angled surface and the front end of the rear floor portion including an angled surface such that the forward and rear floor portions are longitudinally displaceable with respect to each other by interaction between these angled surfaces upon application of a forward force to the vehicle such as during a collision, and a joint connecting the forward and rear floor portions whereby the forward floor portion can be slidably moved along with the rearward floor portion and the rearward floor portion can be angularly displaced about the joint.

6 Claims, 5 Drawing Sheets

SLIDING CARGO FLOOR

FIELD OF THE INVENTION

The present invention relates to a sliding cargo floor intended primarily for 3- and 5-door vehicles, for example station wagons, vans, SUV (Sport Utility Vehicle), when loading and unloading luggage, cargo and the like.

BACKGROUND OF THE INVENTION

A problem with vehicles of the above-mentioned type is the lifting of heavy cargo, often sideways, as well as difficulties in stowing heavy objects at the far end of the cargo space and problems when accessing objects which have been stowed at the far end of the cargo space. Due to these difficulties, heavy objects are often stowed at the outermost portion of the cargo space. This causes, among other things, an incorrect load distribution in the vehicle, and in addition the cargo is incorrectly stowed and might be brought into motion in the event of a collision. Furthermore, a need now arises for heavy objects to be moved whenever one wishes to access cargo which has been stowed deeper into the cargo space.

The advantages of a sliding cargo floor are that unnecessary loads on one's back and legs due to heavy lifting are avoided, and at the same time there is no need to come into contact with potentially dirty objects such as bumpers, sills and tow bars. Furthermore, shopping bags, soft drink crates and the like do not need to be lifted as far into the car, and at the same time heavy objects such as outboard engines and lawn mowers can be stowed close to the front wall of the cargo space (the back of the rear seat) in order to obtain better protection in the event of a collision. A floor which has been slid out can also be used to sit on, or can be used as a table during breaks, and can be made easily removable (without tools) for cleaning. A further advantage is that the floor of the cargo space, which is often covered with a mat, is less exposed to wear by objects which normally must be dragged across the floor.

A floor of this kind is known from International Application No. WO 82/02175, which discloses a sliding floor which runs on rails in a cargo space. The floor consists of a platform formed in one piece, which in one embodiment can be both slid out backwards and be pushed forward over a lowered rear seat.

The drawback of a one-piece platform of this type is that it is not deformable if the vehicle is hit from behind. This causes a heavy load on the forward wall of the cargo space. If this wall consists of the back of a rear seat, the fastening points of the rear seat might break, in which case the back is pressed into the passenger compartment.

The present invention is intended to provide an improved cargo floor which is both slidable, and safe in the event of a collision. In the event of a Collision from behind, it is an advantage if the back of the rear seat is not exposed to in additional load from a sliding cargo floor, since the back of the rear seat must absorb forces both from the fastening points of the seatbelts and the cargo.

SUMMARY OF THE INVENTION

In accordance with the present invention, this and other objects have now been realized by the invention of a cargo floor for use in vehicles, the cargo floor including a forward floor portion having a forward end and a rearward end, a rearward floor portion slidably movable within the vehicle and having a forward end and a rearward end, the rearward end of the forward floor portion being juxtaposed with the forward end of the rearward floor portion, the rearward end of the forward floor portion including a first angled surface and the forward end of the rearward floor portion including a second angled surface whereby the forward floor portion and the rearward floor portion are longitudinally displaceable with respect to each other by interaction between the first and second angled surfaces upon application of a forward force to the vehicle, and a joint connecting the forward floor portion to the rearward floor portion whereby the forward floor portion can be slidably moved along with the rearward floor portion and the rearward floor portion can be angularly displaced about the joint. Preferably, the joint comprises a hinge.

In accordance with one embodiment of the cargo floor of the present invention, the joint comprises a first hook-shaped member associated with the rearward floor portion and a second hook-shaped member associated with the forward floor portion whereby the first and second hook-shaped members can releasably engage each other.

In accordance with another embodiment of the cargo floor of the present invention, the cargo flow includes locking means disposed in the vehicle for locking the cargo floor in a predetermined position within the vehicle.

In accordance with another embodiment of the cargo floor of the present invention, the cargo floor inlcudes rollers disposed in the vehicle for assisting in the slidable movement of the rearward floor portion. Preferably, the cargo floor includes a pair of rails disposed in the vehicle along the sides of the rearward floor portion, whereby the rollers can engage the pair of rails.

The objects of this invention are realized by the cargo floor comprising a longitudinal P-joint or junction in the cargo floor, which, in the event of a heavy load, for example a collision from behind, permits the floor to be deformed in such a manner that a rear portion slides beneath or above a forward portion. The words front and rear in this context refer to the relative position of the parts in the principal direction of travel of the vehicle.

BRIEF DESCRIPTION OF THE DRAWINGS

The present invention will be more fully appreciated with reference to the following detailed description, with reference to the appended drawings, in which.

DETAILED DESCRIPTION

Figure 1:
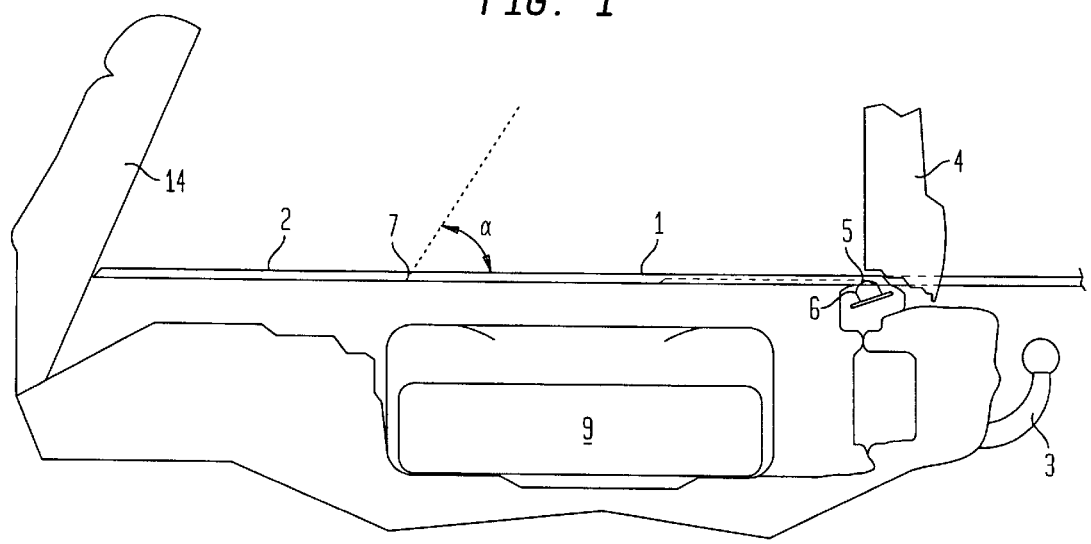
FIG. 1 is a side, elevational cross-sectional, partial view of the cargo space of the present invention.

The function of a cargo floor in accordance with the present invention can essentially be derived from FIG. 1. A rear cargo floor (1), and alternatively a rear cargo floor together with a front cargo floor (2), can be slid backwards at least so far that it extends beyond a tow bar (3), i.e. at least about 30 cm. It is not necessary to lift the floor in order to slide it out, since it is supported by one or more pairs of rollers along the sides, and crosswise by a sill in the cargo opening in the vehicle.

A locking shackle (5) which can interact with a lock in a rear door (4), and which is normally positioned at the center of the lower edge of the cargo opening, runs in a groove (5a) in the bottom side of the cargo floor. This guides the cargo floor in a transverse direction, at the same time as the cargo floor comes into contact with the sill (6) of the cargo opening along the entire width of the cargo space, thus providing good load tolerance.

Figure 2:
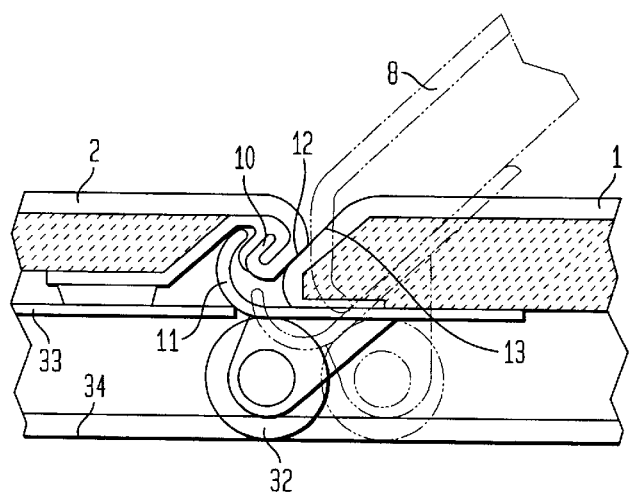
FIG. 2 is a side, elevational, cross-sectional, partial view of a first embodiment of a joint in the cargo floor of the present invention.

A joint (7) between the front (2) and the rear (1) of the cargo-floor can be shaped as shown in FIG. 2. The rear part (1) pulls the front part (2) with it, and can also be hinged at an angle (α) (shaded line (8)), in order to permit access to spare tires (9), etc. To achieve good access, the rear part should be able to be hinged at least 60°. A pair of attachment elements (10,11) with cooperating bent edges extend across the longitudinal extension of the floor, and hook into each other. These elements permit the rear part of the floor to be pulled out along with the front part, and also permit the rear part to be hinged upwards in order to permit access to the space beneath the floor. Since the interacting elements do not constitute a fixed hinged joint, the rear part can also be hinged upwards, and its fastening element can be disconnected from the fastening element of the front part. Subsequent to this, the rear part of the cargo floor can be removed in its entirety. The cooperating elements (10,11) are also provided with oblique surfaces (12,13), which are in contact with each other. The angle of the surfaces relative to the horizontal plane of the cargo floor is suitably less than 45°. In case of a collision from behind, those surfaces permit the rear part of the cargo floor to slide in is beneath the front part, thus avoiding transmitting large forces to the back of the rear seat (14).

Figure 3:
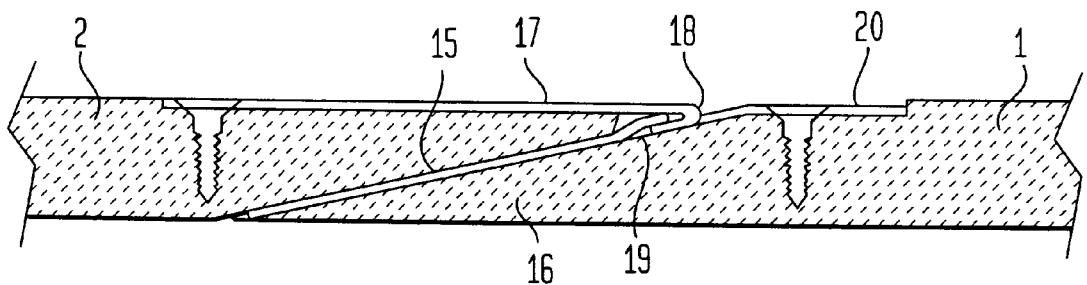
FIG. 3 is a side, elevational, cross-sectional, partial view of another embodiment of a collision deformable transverse joint in the cargo floor of the present invention.
Figure 4:
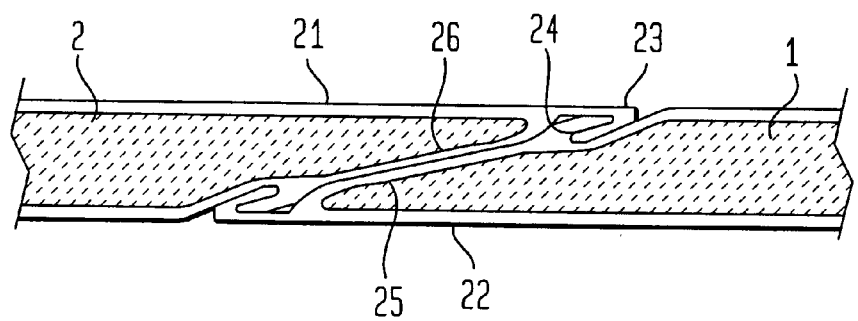
FIG. 4 is a side, elevational, cross-sectional, partial view of another embodiment of a collision deformable transverse joint in the cargo floor of the present invention.

Alternatively, the rear floor (1) can, if it is long enough to possibly abut against a rear seat back (14), be provided with a transverse joint according to FIG. 3 or FIG. 4. The embodiment shown in FIG. 3 can support the load of two grown persons sitting on the edge of a slid-out floor, while the floor needs support along the sides when in the slid-in position. In this case, the two parts (1,2) of the floor are provided with oblique surfaces (15) and (16) which are in contact with each other, and where the rear edge of the front part has a fitting (17) with one of several tongues (18) which are bent downwards and a surface (15) which slopes downwards in the forward direction. These tongues (18) interact with a corresponding number of notches (19) in a further fitting (20), which is attached to the front edge (16) of the rear part which slopes downwards. The embodiment shown in FIG. 4 instead has a pair of identical longitudinal attachment elements (21,22), which are both provided with a bent edge (23) and a notch (24), separated by oblique surfaces (25,26) which are in contact with each other. When assembled, the bent edge (23) of the front floor (2) interacts with the notch (24) of the rear floor, and vice versa. The locking which the fastening elements provide between the front and the rear floor reduce the need for support along the sides of the floor. In the event of a collision from behind, the fastening elements are detached from each other and the oblique surfaces (25,26) ensure that the rear part of the floor slides beneath the front part. Alternatively, the oblique surfaces can also be arranged so that the rear part slides up on top of the front part.

Figure 7:
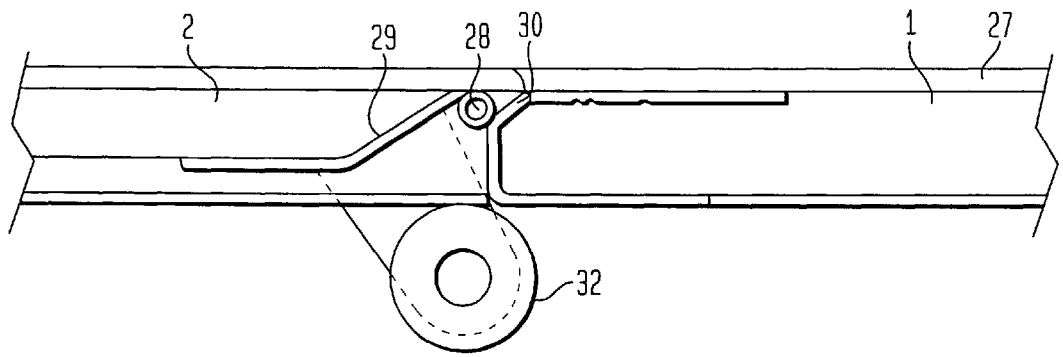
FIG. 7 is a side, elevational, partial view of a second embodiment of a joint in the cargo floor of the present invention.

Other embodiments might be to shape the entire floor in one piece, with a fractural impression or a deformation joint in the transverse direction of the floor. Such a floor would, however, be heavy and cumbersome to handle, for example when taking out a spare tire. It is also possible to have a divided floor which is completely covered by a mat (27), and a transverse hinge at the same level as the upper surface of the floor as shown in FIG. 7. The hinge (28) can be shaped so that it can glide apart when the floor is exposed to collision forces from the rear, in which case oblique surfaces (29,30) in the fittings guide the rear floor (1) below the front floor (2). This solution provides a cargo space with an uninterrupted floor surface, but in this case as well, the rear part of the floor can become difficult to handle, and it cannot be lifted out in a simple manner.

Figure 8A:
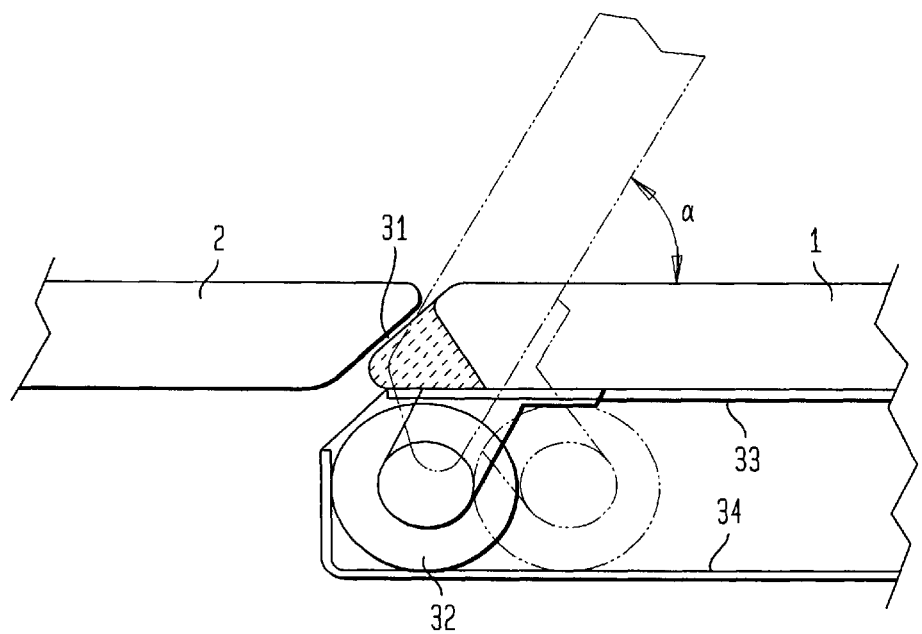
FIG. 8A is a side, elevational, partial view of a hinged cargo floor with rollers in accordance with the present invention.
Figure 8B:
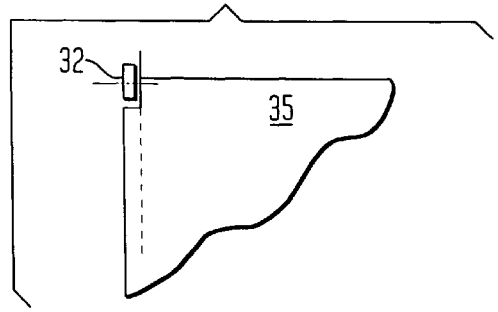
FIG. 8B is a top, elevational, plan, partial view of a cargo floor with rollers in accordance with the present invention.

A further solution is to permit only the rear part (1) of the cargo floor to be slidable, while the front part (2) is fixed, as shown in FIG. 8. The sliding part should then be somewhat longer than has been described above. In this case as well, the rear part is provided with an oblique forward edge (31) designed to slide in below. It is possible to also equip the rear part (1) with a separate transverse deformation joint, so that it, in the event of a collision, does not reach the back of the rear seat due to its increased length.

Figure 6A:
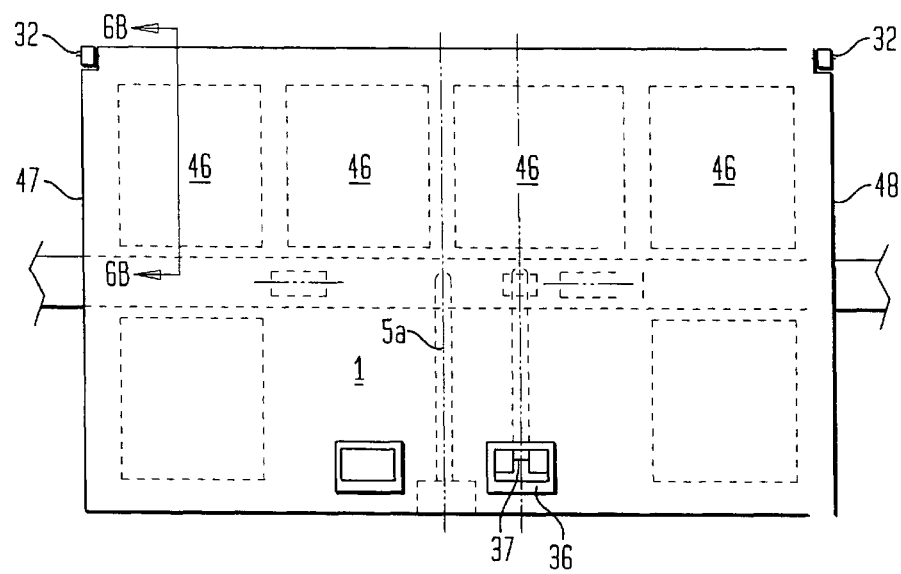
FIG. 6A is a top, elevational, plan view of a cargo floor in accordance with the present invention.
Figure 6B:
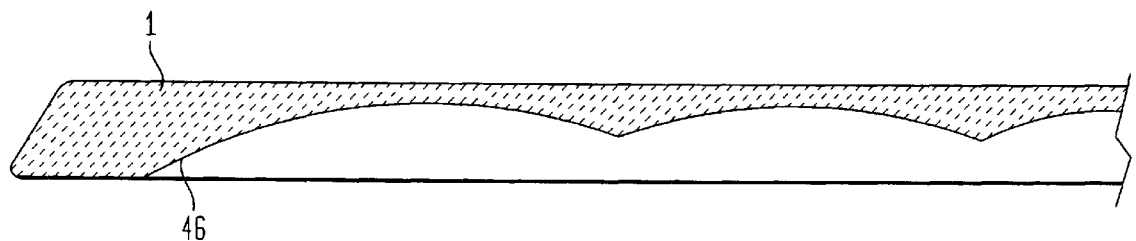
FIG. 6B is a side, elevational, partial cross-sectional view of a cargo floor with recesses in accordance with the present invention.

In order to reduce the friction against the surface when sliding the floor out, the floor can be provided with rollers (32) on its lower part, in its forward corners (see FIGS. 2 and 6A). These rollers can run between rails (33,34) arranged above and below each roller (32) under the outer longitudinal ends (47,48) of the floor, but can also be positioned along these edges. In the embodiment shown in FIGS. 8 and 8A, recesses (35) must be made at the front edge of the rear floor in connection to the rollers (32), so that the floor can be hinged upwards without being pinned against the gliding rails (33,34). When the cargo floor 7 slid out, these interacting rollers and gliding rails also serve to contain the cargo when it is positioned at the outermost part of the rear floor. It is also possible to place two or more rollers in the rear sill of the car in order to further reduce the friction against the surface.

Figure 5A:
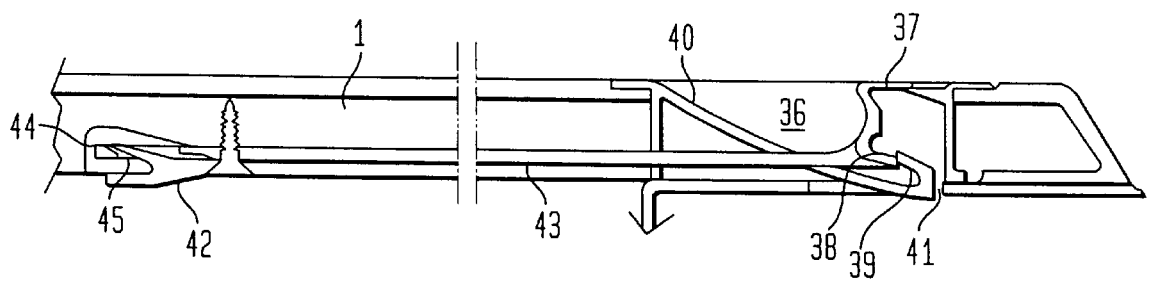
FIG. 5A is a side, elevational, cross-sectional view of a locking means for the cargo floor of the present invention.
Figure 5B:
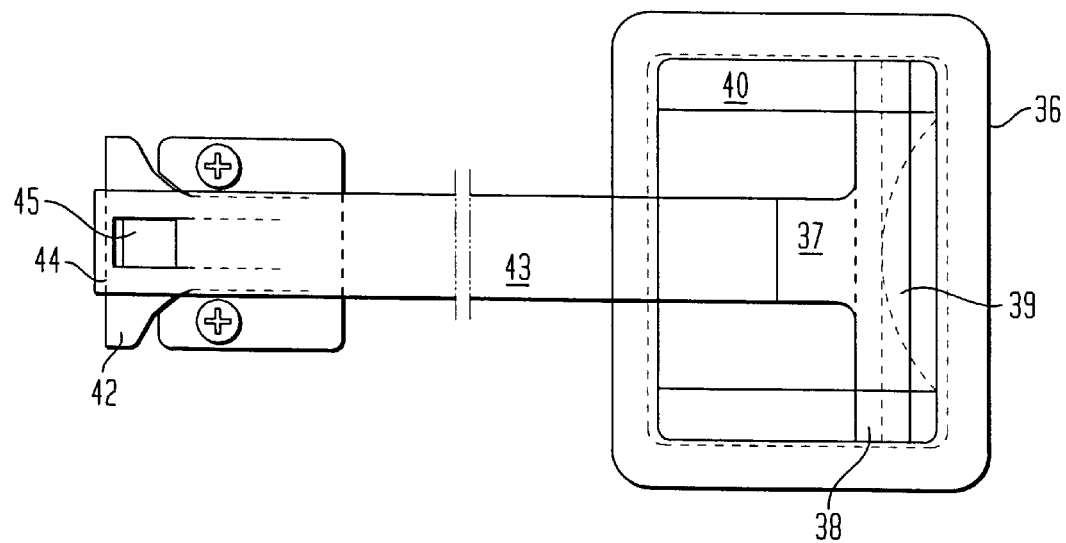
FIG. 5B is a top, elevational, plan view of the locking means shown in FIG. 5A.

It is also possible to lock the floor in its sliding and slid-out positions. Such a locking device is shown in FIG. 5 where an attachment means (36), which is recessed in the floor and shaped as one unit, is used to operate locking in both directions. A sliding gripping handle (37) which is arranged in the longitudinal direction of the floor, is pulled backwards, by means of which a first wedge-formed surface (38) in the locking means is moved into engagement with a second wedge-formed surface (39) on a first resilient catch (40). The catch (40) is then lifted out of engagement with a notch (41) in the body or the sill of the vehicle, and the floor can be pulled out.

In the completely pulled-out position, a second resilient catch (42), which is arranged on the underside of the cargo floor engages the above-mentioned notch (41). By influencing the gripping handle (37), a third wedge-formed surface (44) in the locking means is brought into contact with a fourth wedge-formed surface (45) on the second catch (42) by means of an actuating organ (43) which extends below the cargo floor (1). The second catch (42) is then lifted out of engagement with the notch (41), and the cargo floor can be slid in.

The cargo floor can be manufactured from a variety of different materials. A preferred material is cross veneer. In order to make the cargo floor more stable, it can be equipped with a number of suitably placed recesses, which also cause a certain reduction in weight. It is also possible to use a material with a honeycomb structure, pressed GMT (Glass Mat Thermoplastic) or the like. If, for example GMT is used, the mat, the hinges and the gripping handle can be integrated in the floor.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A cargo floor for use in vehicles, said cargo floor including a forward floor portion having a forward end and a rearward end, a rearward floor portion slidably movable within said vehicle and having a forward end and a rearward end, said rearward end of said forward floor portion being juxtaposed with said forward end of said rearward floor portion, said rearward end of said forward floor portion including a first angled surface and said forward end of said rearward floor portion including a second angled surface whereby said forward floor portion and said rearward floor portion are longitudinally displaceable with respect to each other by interaction between said first and second angled surfaces upon application of a forward force to said vehicle, and a joint connecting said forward floor portion to said rearward floor portion whereby said forward floor portion can be slidably moved along with said rearward floor portion and said rearward floor portion can be angularly displaced about said joint.

2. The cargo floor of claim 1 wherein said joint comprises a hinge.

3. The cargo floor of claim 1 wherein said joint comprises a first hook-shaped member associated with said rearward floor portion and a second hook-shaped member associated with said forward floor portion whereby said first and second hook-shaped members can releasably engage each other.

4. The cargo floor of claim 1 including locking means disposed on said cargo floor for locking said cargo floor in a predetermined position within said vehicle.

5. The cargo floor of claim 1 including rollers disposed on said cargo floor for assisting in said slidable movement of said rearward floor portion.

6. The cargo floor of claim 5 wherein said rollers are for disposition in rails of said vehicles.

* * * * *